(12) United States Patent
Sowerby

(10) Patent No.: US 7,664,317 B1
(45) Date of Patent: Feb. 16, 2010

(54) VIDEO ANALYSIS

(75) Inventor: Scott Sowerby, Auburn, IN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 730 days.

(21) Appl. No.: 11/386,783

(22) Filed: Mar. 23, 2006

(51) Int. Cl.
*G06K 9/00* (2006.01)
*G06K 9/68* (2006.01)
*G06K 9/36* (2006.01)

(52) U.S. Cl. ........................... 382/162; 382/218
(58) Field of Classification Search .............. 348/175, 348/177, 179, 182, 184, 186, 188, 228.1, 348/E17.004; 382/162, 164, 167, 173, 218–219, 382/254, 305; 358/504, 506, 512, 515, 518
See application file for complete search history.

(56) References Cited

U.S. PATENT DOCUMENTS

| | | | | |
|---|---|---|---|---|
| 4,628,342 A | * | 12/1986 | Desmons et al. | 348/188 |
| 4,858,027 A | * | 8/1989 | Sashou et al. | 386/4 |
| 5,453,853 A | * | 9/1995 | Sakai et al. | 358/518 |
| 5,455,620 A | * | 10/1995 | Stevens et al. | 348/184 |
| 7,113,880 B1 | * | 9/2006 | Rhea et al. | 702/117 |
| 2005/0226524 A1 | * | 10/2005 | Komiya et al. | 382/254 |

* cited by examiner

*Primary Examiner*—Amir Alavi

(57) ABSTRACT

A method is provided including capturing a frame from a first video device, the frame representing a test pattern and determination is made of at least one captured color for at least one pixel of the captured frame. A reference pixel is provided including at least one reference color, the reference pixel being determined by statistical analysis of the first signals from a population of second video devices that have received the test pattern. A relation is determined between the captured color value and said reference color and the relation is compared with a threshold value. The relation is stored.

24 Claims, 7 Drawing Sheets

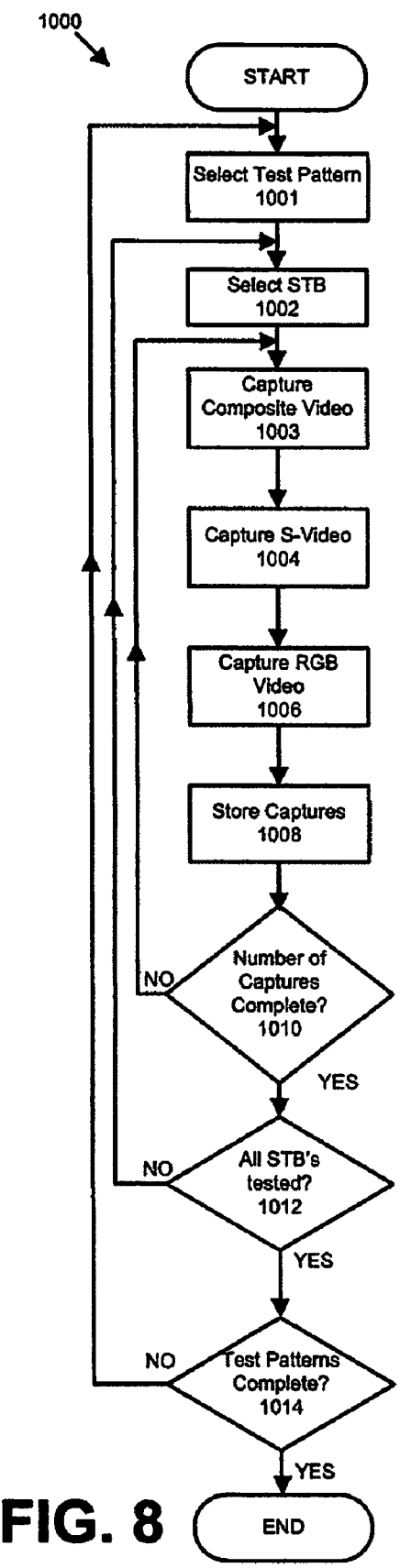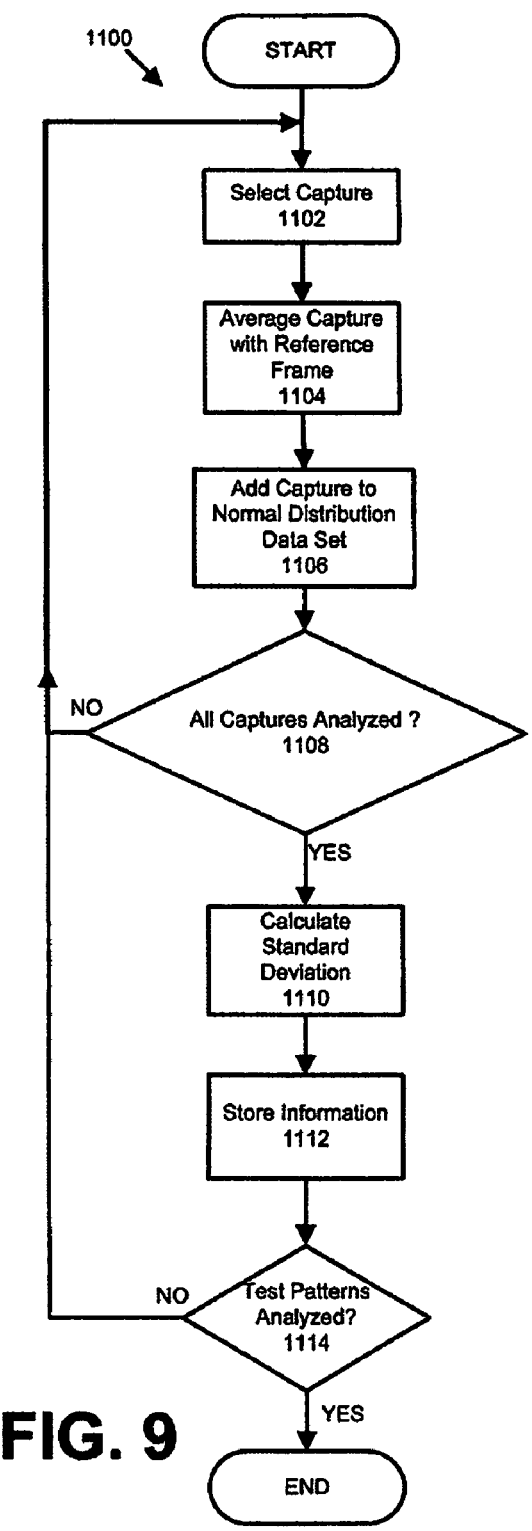
FIG. 8
FIG. 9

VIDEO ANALYSIS

BACKGROUND INFORMATION

Set top boxes (STBs) are known for use in video networks such as cable television networks, fiber-optic networks, and the like, for enabling the delivery of specialized programming and services to customers. STBs support the provision of services to video services customers such as pay-per-view (PPV) programming and the like, in addition to providing basic functionality such as receiving a video signal and providing the video signal to the customer's television set, allowing the customer to select video channels for display on the television set, etc. STBs are generally owned by the provider of video services rather than by their customers, i.e., end users of video services. Accordingly, when a customer having an STB terminates or changes a video service subscription, the video service provider generally reclaims the customer's STB, and, often after performing testing and any necessary repair or reconditioning to the STB, redeploys the STB to another customer.

There are many kinds of tests that can be performed on an STB, whether it is newly manufactured or is being analyzed after use in the field. Generally, after an STB has been used in the field, it is desirable, among other things, to analyze the quality of images provided by the STB. Present systems and methods for testing and analyzing STBs rely on human beings to visually inspect the image quality output by an STB. Typically, the video output comprises streaming video in a loop. The human tester then determines whether the image is of sufficient quality. Additionally, machine testing may be performed using special equipment connected to internal test points within the STB to measure a signal for quality.

However, human-based testing of STBs has drawbacks. Human testing is highly subjective and wherein quality determinations are made by an individual person not capable of quantifying video quality or repeating the test in a standardized manner. Further, in test environments having numerous human testers, a video quality determination is at best highly variable, and often highly subjective. Moreover, the standard or standards for establishing video quality are difficult to establish and enforce. In some test environments, it would be desirable to adjust the standard or standards for judging video quality of STBs to control the number of STBs deemed "passed" or "failed" by the test environment, but such adjustments are difficult to achieve where different testers are following different, generally unpredictable, standards.

Because of the manual nature of present systems and methods for testing and analyzing STBs, testing and analyzing STBs is at present generally slow and inefficient, requiring a technician to test each STB individually and manually. Further, the manual nature of present systems and methods for testing and analyzing STBs means that test results are subjective, depending on the vision, hearing, and judgment of the technician testing an STB. Therefore, present systems and methods fail to provide an adequate determination as to whether an STB should be deployed or redeployed into the field that is standardized or that is generally reliable. Additionally, with human testing, a selective pass rate cannot be achieved because there is no way to accurately describe to a human tester where the "pass" video quality threshold is. Typically, with human testing, either the tester likes the video signal or objects to the video signal.

Accordingly, there is a need for systems and methods to automate the testing and analysis of STBs. Such systems and methods would advantageously cause the testing and analysis of STBs to be standardized, and therefore to be more reliable than present systems and methods. Such systems and methods would further be more efficient and cost-effective than is presently possible, and would preferably allow multiple STBs to be tested at once. Additionally, controllability of quality thresholds relating to video signals output from an STB would advantageously allow technicians to control the number of STBs accepted or rejected in the test environment.

BRIEF DESCRIPTION OF THE DRAWINGS

FIG. 8 illustrates a process that includes the video capture of an image for each STB and the resultant addition of the captured image, e.g. a capture frame, to a test database.

FIG. 9 illustrates a process in which capture frames are analyzed and a reference file is generated.

DETAILED DESCRIPTION OF THE PREFERRED EMBODIMENTS

Figure 1:
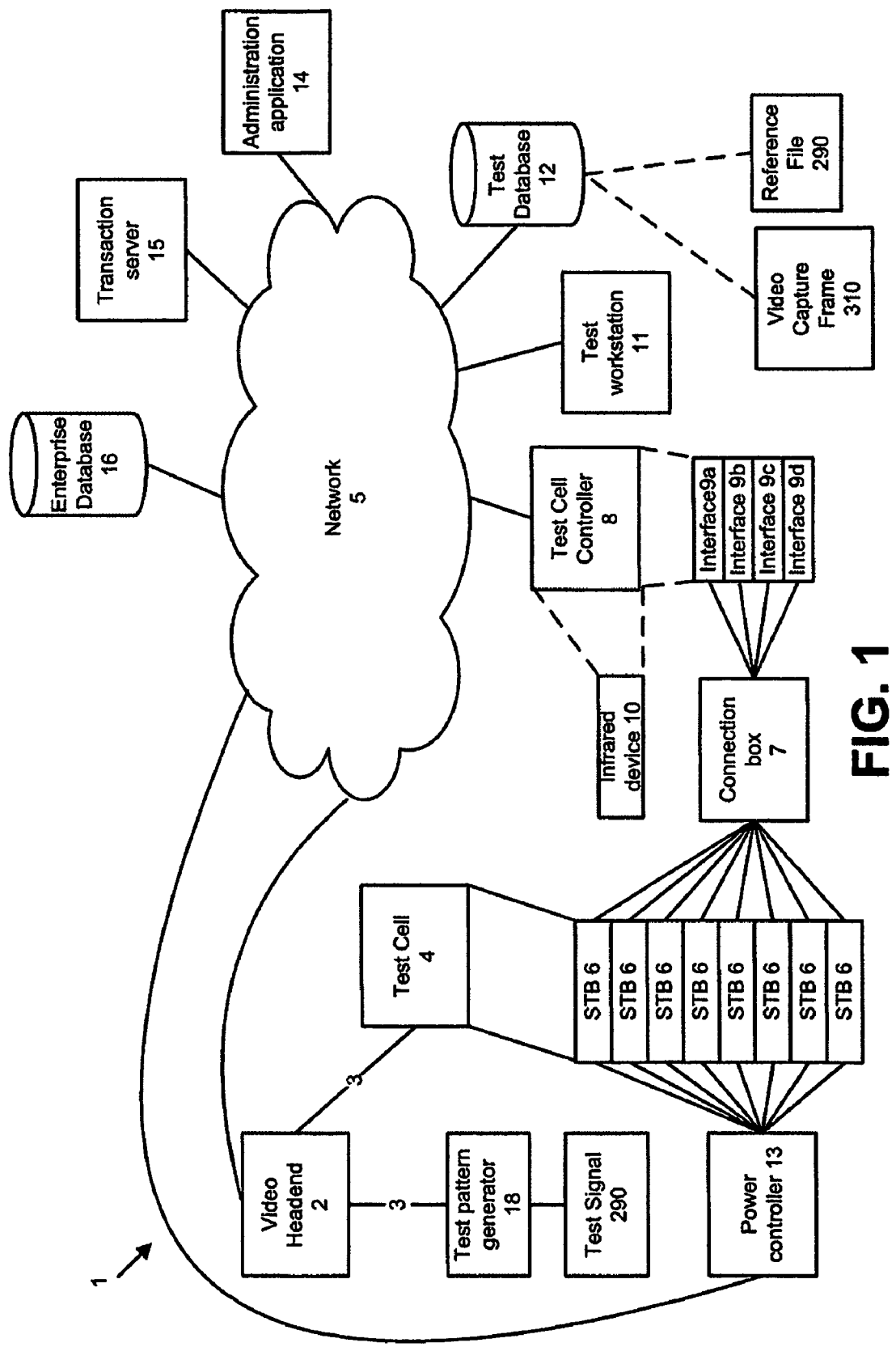
FIG. 1 illustrates a set top box test system, according to an embodiment.

Referring now to the drawings, illustrative embodiments are shown in detail. Although the drawings represent these embodiments, the drawings are not necessarily to scale and certain features may be exaggerated to better illustrate and explain a particular aspect of an embodiment. Further, the embodiments described herein are not intended to be exhaustive or otherwise limit or restrict the claimed invention to the precise form and configuration shown in the drawings and disclosed in the following detailed description or the preferred embodiments.

Testing of a video interface for multimedia devices, can be advantageously facilitated by a test environment comprising one or more computing devices for receiving inputs from the outputs of multimedia devices. By using a computing device such as a personal computer to receive all of the different signals, e.g., video, provided by a multimedia device such as a set top box ("STB"), it is possible to test multimedia devices in a consistent and efficient manner. Further, employing one or more interfaces in a computing device to simultaneously or nearly simultaneously receive various (e.g., three) different kinds of video signals enhances the afore-mentioned consistency and efficiency. Information concerning multimedia devices and tests and analyses thereof may be stored in a database accessible to one or more computing devices in the test environment. By analyzing signals provided by a multimedia device, it is advantageously possible to test the multimedia device without accessing the device using information or commands that may be proprietary to the device's manufacturer.

Test System Overview

FIG. 1 illustrates a test system 1, according to an embodiment. Test system 1 is also described in co-pending U.S. application Ser. No. 11/386,784, titled "MULTIMEDIA DEVICE TESTING," filed on the same date as the present application, which is incorporated herein by reference in its entirety. Video headend 2 provides video signals to a video network 3. Video headend 2 generally includes a conditional access controller such as a digitally addressable controller (DAC) sold by Motorola, Inc. of Schaumburg, Ill. Video network 3 is known to those skilled in the art for transporting RF signals via fiber optic and/or coaxial cable. Further, through the afore-mentioned DAC, video headend 2 generally communicates over a network that supports Ethernet communications, such as network 5.

Video network 3 includes test cell 4. Many embodiments include more than one test cell 4. Test cell 4 includes a rack that holds one or more multimedia devices such as set top boxes (STBs) 6 for testing. In one presently preferred embodiment, each test cell 4 includes eight STBs 6. STBs 6 may be manufactured by any one of a variety of vendors. For example, STBs 6 may include the QIP2500, the QIP6416, and the QIP6200, manufactured by Motorola, Inc. of Schaumburg, Ill.

Various data communications described herein as taking place within test system 1 take place via a computer network 5 such as a local area network (LAN) or other network known to those skilled in the art for transporting digital data communications. Network 5 may any one of, or a combination of a variety of, networks known to those skilled in the art, and preferably operates according to well known protocols and standards such as Transfer Control Protocol/Internet Protocol (TCP/IP), Ethernet, 802.11, etc. At least portions of network 5 may be wireless, using, for example, RF communications as known to those skilled in the art. Network 5 may include, without limitation, a Wide Area Network (WAN), Local Area Network (LAN), an intranet, the Internet, etc.

In one embodiment, video headend 2, test cell controller 8, test workstation 11, test database 12, power controller 13, administrative application 14, transaction server 15, and enterprise database 16 all communicate via network 5. Connection box 7 serves to cross connect STBs 6 with interfaces 9 and is not generally connected to network 5.

Test cell controller 8, test workstation 11, administration application 14, and transaction server 15 may each include any one of a number of computing devices known to those skilled in the art, including, without limitation, a computer workstation, a desktop, notebook, laptop, or handheld computer, or some other computing device known to those skilled in the art, such as a Java-enabled cellular telephone or similar device. Computing devices such as the foregoing may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Test cell controller 8, test workstation 11, test database 12, administrative application 14, transaction server 15, and enterprise database 16 may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. One embodiment includes computer programs written in the Visual Basic programming language using the dot-Net framework provided by Microsoft Corporation of Redmond, Wash. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases 12 and 16 each generally comprise a relational database management system (RDBMS) as known to those skilled in the art. An RDBMS generally employs the well known Structured Query Language (SQL) in addition to a language for creating, storing, editing, and executing stored procedures. However, it is to be understood that databases 12 and 16 may be some other kind of database such as a hierarchical database, a set of files, an application database in a proprietary format, etc. Each database 12 and 16 generally includes a computing device employing a computer operating system such as one of those mentioned above, and are accessed via network 5 in any one or more of a variety of manners known to those skilled in the art. Embodiments are possible in which databases 12 and 16 are both included in one RDBMS or are located within a single computing device.

Test cell controller 8 in most embodiments is a general purpose computer such as a personal computer (PC), and may or may not be equipped with a video monitor and input devices such as a keyboard, mouse, etc. Test cell controller 8 communicates with STBs 6 using infrared communication device 10, which may communicate with test cell controller 8 through a universal serial bus (USB) port included within test cell controller 8. In one embodiment, test cell controller 8 includes the USB-UIRT available from the usb-uirt.com web page, although a number of commercially available USB interfaces to an infrared device may be used. The USB-UIRT includes an infrared transmitter that can be instructed by a PC to transmit infrared signals. Test cell controller 8 further communicates with STBs 6 through network 5 and uses a multimedia interface 9 suitable for multimedia data capture, such as a peripheral component interface (PCI), for image capture. Interface 9 is generally a commercial off-the-shelf product such as an interface designed for video surveillance. Interface 9 is discussed in more detail below. In one embodiment, it is desirable that the motherboard included within test cell controller 8 provide at least four PCI slots, and the IS7-E2 sold by ABIT Computer Corporation of Fremont, Calif., which provides five PCI slots, may be used.

Test workstation 11 is also a general purpose computer such as a PC, and communicates with controller 8 via network 5. Test workstation 11 is used by a technician to monitor tests of STBs 6, and to send instructions to, and receive information from, test cell controller 8 concerning a test of STBs 6. Accordingly, test workstation 11 is generally equipped with a video monitor and input devices such as a keyboard, mouse, etc. Test cell controller 8 and test workstation 11 each communicate via network 5 with a test database 12, which generally includes parameters and instructions for testing STBs 6 and also is used to record results of testing STBs 6. Thus, test cell controller 8 and test workstation 11 need not, and generally do not, communicate directly with one another, although embodiments in which such direct communications occur are possible.

In some embodiments, test workstation 11 communicates with a power controller 13 via network 5. Power controller 13 includes receptacles to which electrical plugs attached to STBs 6 may be connected, thereby allowing STBs 6 to be supplied with electrical power remotely by commands sent from test workstation 11. In one embodiment, power controller 13 may be the RPC3 Series sold by Bay Technical Associates of Long Beach Industrial Park, Miss.

Embodiments are possible in which test cell controller 8 and test workstation 11 are included within a single computing device. However, in many embodiments, one test cell controller 8 is generally required for each test cell 4 in order to allow for the physical connections described above between STBs 6 and interfaces 9 included in test cell controller 8. A single test workstation 11, on the other hand, is generally capable of communicating simultaneously, or nearly simultaneously, with a plurality of test cell controllers 8. Accordingly, in many embodiments, locating test cell controller 8 and test workstation 11 on separate computing devices is preferable, and supports scalability of test system 1.

Administration application 14 also communicates with test database 12 via network 5, and is used to change test parameters, generate test reports, and perform other administrative functions for test system 1, some of which are described herein. Further, as described below administrative application 14 communicates via network 5 with enterprise database 16, which includes data concerning STBs 6 and their users. For example, enterprise database 16 may include billing data, inventory data, usage history, and the like for STBs 6. Administration application 14 may be included in the same physical computing device as test cell controller 8 and/or test workstation 11. However, for the reasons noted above it is generally not preferable for administrative application 14 to be included in the same physical computing device as test cell controller 8.

Test pattern generator 18 in one embodiment may be the Transport Streamer TS1692A sold by Sencore, Inc. of Sioux Falls, S. Dak. As described further below, test pattern generator 18 is used to provide audio and video signals to STBs 6 through headend 2 for testing whether audio and video outputs from STBs 6 meet acceptable standards.

Test Cell

Figure 2:
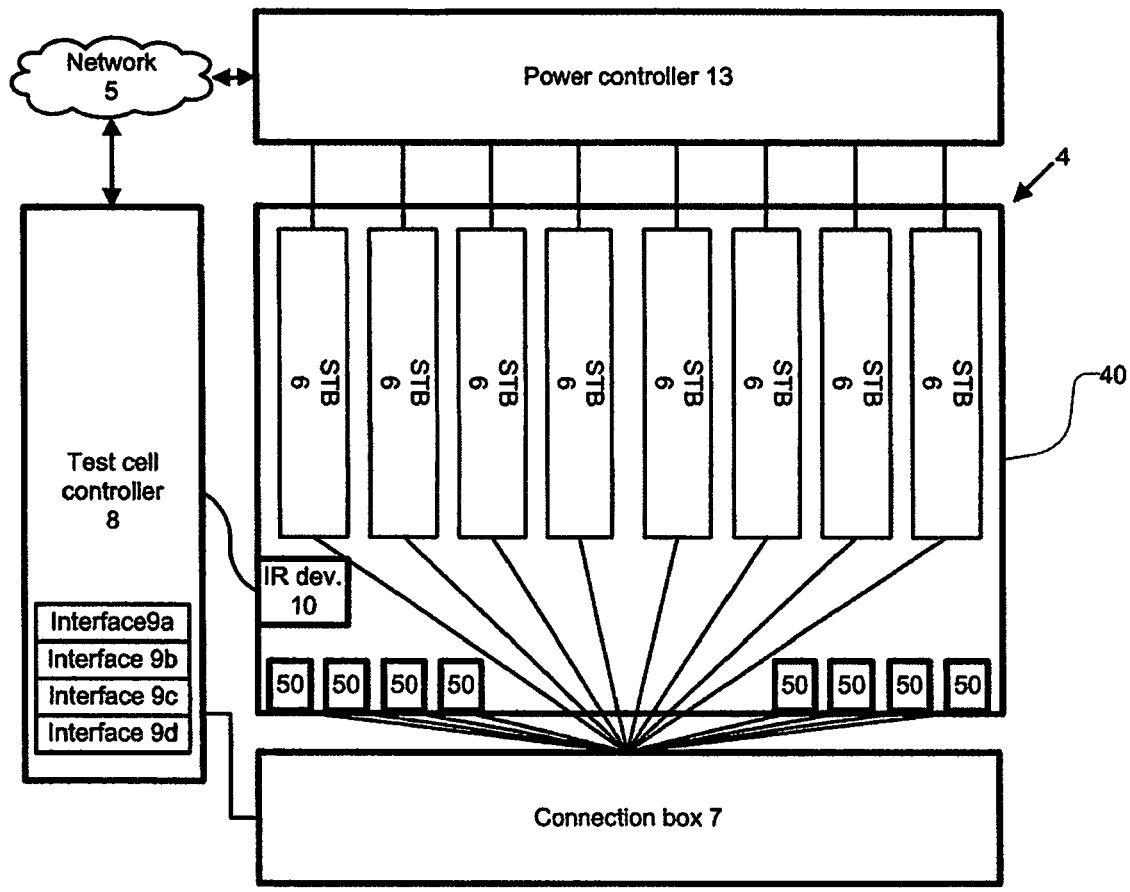
FIG. 2 illustrates a test cell for use with a set top box test system, according to an embodiment.

FIG. 2 illustrates certain details of test cell 4 according to the embodiment illustrated in FIG. 1, including positions for multiple STBs 6 in rack 40. Rack 40 is a shelf or rack, generally having wheels, configured to hold eight, or, in some embodiments sixteen, STBs 6. Each STB 6 is connected to connection box 7, test cell controller 8, and power controller 13. Test cell controller 8 communicates with test system 1, including power controller 13. As shown in FIG. 2, in some embodiments infrared device 10, connected to test cell controller 8 with a cable, is affixed to rack 40.

Further, a camera 50 may be optionally mounted on rack 40 for the purpose of capturing video and/or still images of the front of STB 6. As described further below, images captured by camera 50 may be analyzed, e.g., using known optical character recognition techniques, to support the testing of STB 6. Analyzing images of STB 6 showing, for example, the numbers on a channel display, whether certain light emitting diode (LED) indicators are illuminated, etc., may provide valuable information regarding the state and functionality of STB 6. Accordingly, in the embodiment illustrated in FIG. 2, eight cameras 50 are included to monitor each of eight STBs 6. Camera 50 may be any camera that is commercially available for connection to a personal computer, and generally provides a composite video output through a single cable, thus allowing for easy connection of camera 50 to interface 9, in some embodiments through connection box 7, as described below.

The connection of STBs 6 to interfaces 9, in some embodiments through connection box 7, is also described in more detail below.

Multimedia Interface

Figure 3:
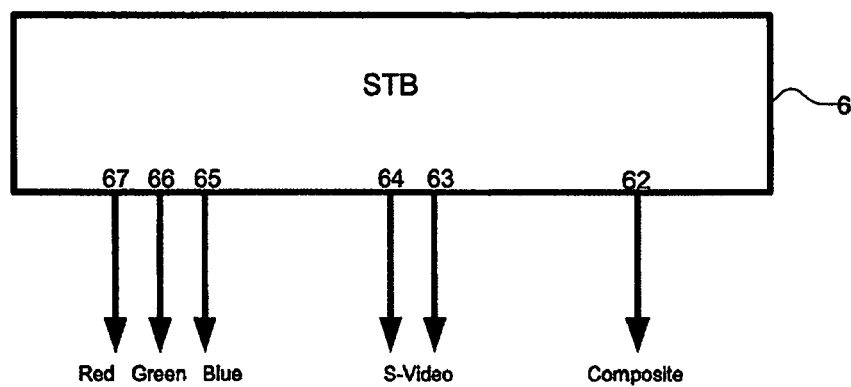
FIG. 3 illustrates output from STB 6, according to an embodiment.

FIG. 3 illustrates outputs 62-67 of STB 6, according to an embodiment. In general, STB composite output 62 provides output of a composite video signal, STB S-video outputs 63, 64 provide output of a separated, or S-video signal, and RGB outputs 65, 66, and 67 provide component RGB video signals. Thus, for each STB 6 under test, six video signal inputs of interface 9 are used to receive outputs 62-67, the different types of video signals also being different categories of signals. However, as described further below, in many embodiments different outputs 62-67 from a single STB 6 are provided to different interfaces 9 included within test cell controller 8.

In one embodiment, test cell controller 8 includes four interfaces 9, each interface 9 having sixteen signal inputs. For example, interfaces 9 may be embodied as the FlashBus Spectrim Pro manufactured by Integral Technologies of Indianapolis, Ind. Test cell 4 in this embodiment includes eight STBs 6. Interfaces 9 are used to receive signals from STBs 6 in three different configurations as follows. In a first configuration, eight signal inputs in a first interface 9a are used to receive inputs from a composite video jack connected to each of the eight STBs 6. The other eight signal inputs in the first interface 9a are unused in some embodiments, but in other embodiments may be used to receive inputs from cameras 50. In a second configuration, sixteen signal inputs in a second interface 9b are used to receive separated video (S-video) inputs from two S-video jacks included in each of the eight STBs 6. In a third configuration, twelve signal inputs in a third interface 9c are used to receive inputs from three RGB component video jacks that are connected to a first four of the eight STBs 6. The other four signal inputs in the third interface 9c are unused in this configuration. Those skilled in the art will understand that embodiments are possible in which these four inputs are used for synchronization for each RGB channel. Twelve inputs in a fourth interface 9*d*, also in the third configuration, are used to receive signal inputs from three RGB component video jacks that are connected to a second four of the eight STBs 6. The other four inputs in the fourth interface 9*d* are unused.

Figure 4:
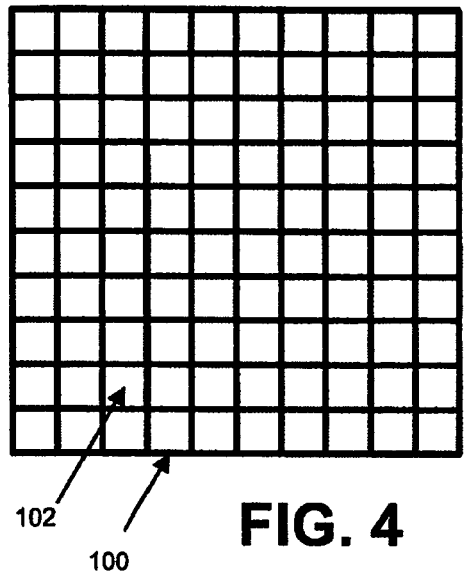
FIG. 4 illustrates a ten-by-ten pixel video frame for use with a set top box test system, according to an embodiment.

STB 6, interface 9, and the relationship and connections between them, including cross connection box 7, as used in some embodiments, are described in even more detail in the co-pending application identified above Test Patterns and Capture FIG. 4 illustrates a video frame 100 that includes pixels 102, according to an embodiment. In this example, video frame 100 is a ten-pixel-by-ten-pixel (10×10) video image. Interface 9 pixelates analog video output from STB 6 and in this way, an image is digitized into discrete pixels 102. Interface 9 further digitizes and quantizes the color of each pixel as is described in detail below. Although a 10×10 video image is used for this example, an entire video image in a real-world application is generally larger, e.g., comprising a standard 640 by 480 pixel image. Further, test system 1 may include the use of smaller or larger digitized images that may include particular regions of interest or greater desired resolution for test. Thus, interface 9 must accommodate the intended resolution of video frame 100. For example, where a High Definition TV ("HDTV") signal is under test, the digitized image may be 1280 by 720 or 1920 by 1080, depending upon the HDTV standard used.

Figure 5A:
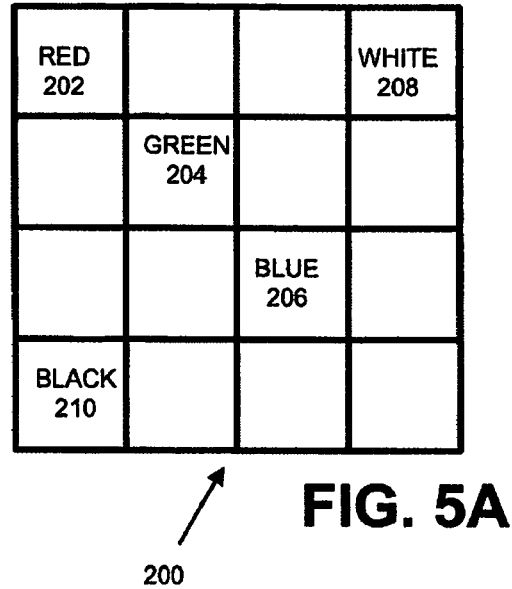
FIG. 5A illustrates an example of a color block test pattern.

FIG. 5A illustrates a color block test pattern 200 that includes segmented regions having known RGB values, according to an embodiment. STB 6 is provided a signal that nominally produces color block test pattern 200. The standard notation for RGB values can be summarized as a set of {red, green, blue} in a "triplet." The triplet comprising values for primary colors, used as reference colors, that are combined to determine an overall pixel color. For the purposes of the presently disclosed embodiments, the RGB notation described herein is to be understood as referring to an 8-bit environment. Each of the red, green, and blue values of the RGB triplet are used to quantify the relative amount of red, green, and blue in each pixel of an image. A value of zero (0) associated with a member of the triplet indicates an absence of that primary color, while a value of two-hundred-fifty-five (255) represents the full intensity of the associated color in the RGB triplet.

A white region 208 is represented by maximum values for all RGB components, e.g. (255, 255, 255). A black region 210 is represented by the minimum value, zero, for each RGB component, e.g., (0,0,0). A red region 202 includes RGB values of (255,0,0) that indicates a maximum of red content while having an absence of green and blue. A green region 204 includes RGB values of (0,255,0) that indicates an absence of red and blue, while maximizing the green content. A blue region 206 includes RGB component values of (0,0,255) that indicate an absence of red and green, while maximizing the blue content.

In addition to testing colored regions, a "video disabled" test may be conducted where STB 6 is powered, but the video outputs are disabled, and the video outputs are then tested for the presence of a video output signal. Such a test can be used to confirm that STB 6 is in a "video disabled" mode, or in some cases, is malfunctioning because a video signal is still present. Further, where STB 6 is supposed to be turned on and displaying a video signal, a comparison with the absolute black content may be performed to verify that STB 6 is indeed not turned on. Such a test can be helpful to determine whether or not STB 6 is functioning at even the most basic levels or whether STB 6 is clearly defective. Additionally, the "video disabled" test determines whether STB 6 is ready for shipping to a user where STB 6 has not been provisioned (i.e., STB 6 is deactivated for use until activated through a billing system).

Figure 5B:
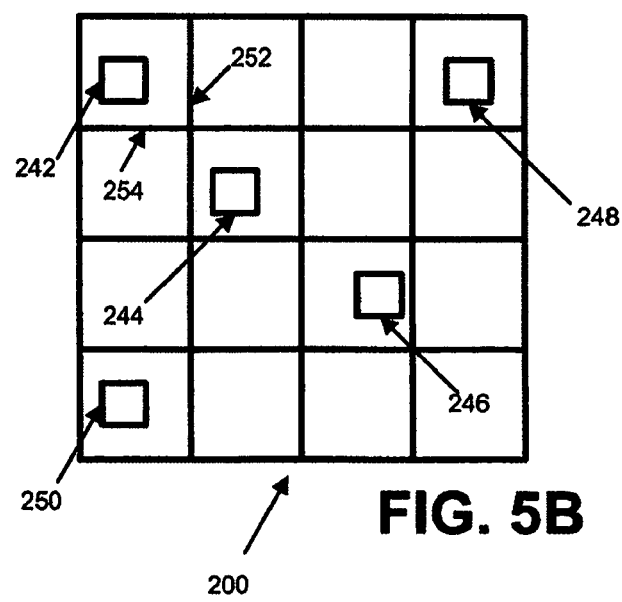
FIG. 5B illustrates an example of a test pattern including capture regions.

FIG. 5B illustrates a white capture region 248, a black capture region 250, a red capture region 242, a green capture region 244, and a blue capture region 246 of color block test pattern 200. The regions indicated for capture regions 248, 250, 242, 244, and 246 are centrally located within the boundaries of white region 208, black region 210, red region 202, green region 204, and blue region 206, respectively. Thus, a small phase shift in picture location (e.g., a screen image being shifted) will not result in a capture region encompassing adjacent regions because the capture regions are well within the colored regions rather than being near edge boundaries 252, 254 between colored regions.

Figure 6:
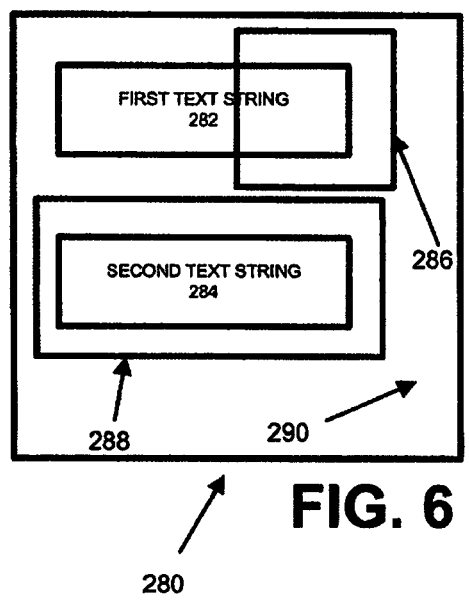
FIG. 6 illustrates a menu system including a first text line, a second text line, a first text capture region, and a second text capture region, according to an embodiment.

FIG. 6 illustrates a menu video output 280 having a first text string 282, a second text string 284, a first text capture region 286, and a second text capture region 288. STB 6 is controlled in a manner to produce menu video output 280. For example, power is applied to STB 6 and STB 6 is controlled through IR device 10, e.g., as described in the co-pending application identified above, to produce menu video output 280. Interface 9 then captures video frame 100 and test cell controller 8 extracts first text capture region 286 and second text capture region 288 from video frame 100. In the example illustrated in FIG. 6, first text capture region 286 includes only a portion of first text string 282 in addition to a background 290. Second text capture region 288 includes capturing the entirety of second text string 284 as well as a portion of background 290. Test system 1 may then use capture regions 286, 288 in a pixel-by-pixel manner, or use character recognition to identify first text string 282 and second text string 284.

In addition to video frame 100, color block test pattern 200, and menu video output 280, test system 1 may incorporate any number of test signals or arbitrary video test signals that are capable of being presented by STB 6 and captured for test. Thus, any variation of test patterns 200 may be applied, e.g., EIA Color Bars, EBU Color Bars, SMPTE-style Color Bars, 5-Step Luma Test, 10-Step Luma Test, Luma Ramp, Convergence, Overscan, Sarnoff. etc. In general, test patterns 200 are designed to stress the video components of STB 6 by rapidly changing the colors and patterns presented (e.g., a blue region directly adjacent to a red region, therein requiring an immediate color change from (0,0,255) to (255,0,0)). Additionally, text and menu systems capable of being displayed by STB 6 may be used during test.

Reference File

Figure 7:
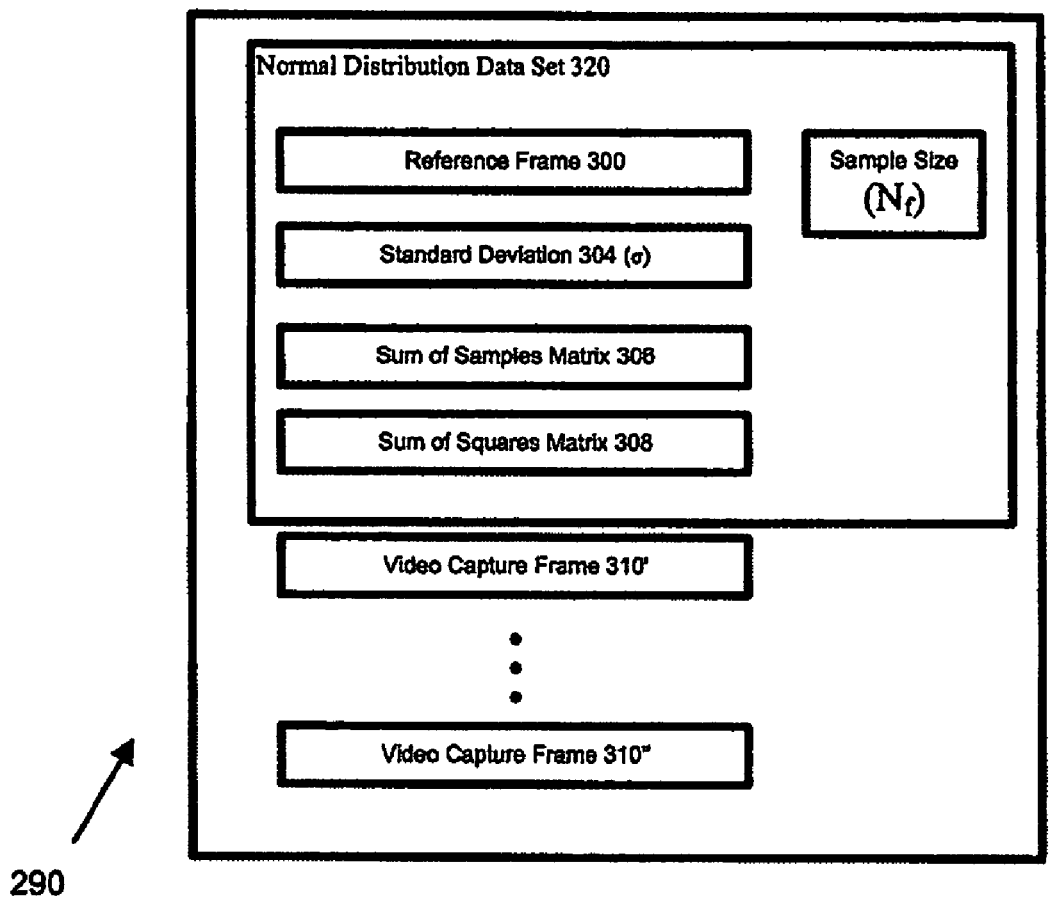
FIG. 7 illustrates a reference file for use with the test system of FIG. 1, according to an embodiment.

FIG. 7 illustrates a reference file 290 for use with test system 1. Test database 12 generally stores one or more reference files 290. Reference file 290 is constructed using statistical analysis methods based on numerous frame captures from a population of video devices and is used for comparing STBs 6 under test in test system 1. Reference file 290 includes a reference frame 300, i.e., a pixel-by-pixel matrix comprised of averaged samples from various "known good" STBs 6, explained below in detail, produced before testing of STBs 6 is undertaken. It is understood that each pixel of reference frame 300 includes individual color values (i.e., red, green, and blue). Reference file 290 further includes a sample size ($N_f$) and a normal distribution data set 320 including the calculated standard deviations for each pixel and each color of each pixel of reference frame 300. Further, for the purposes of statistical analysis, a sum of samples matrix 306 and a sum of squares matrix 308 is also stored for maintenance purposes (explained below in detail with respect to FIG. 9). Although not necessary for the routine testing of STBs 6, a plurality of capture frames 310', 310" may be included as evidence of the construction of reference file 290, as discussed in more detail below.

An exemplary test system 1 according to one embodiment includes at least 1000 samples for test pattern 200 for each of at least ten "known good" STBs 6 and for each of the outputs of each of the ten STBs 6. Thus, in this example, reference file 290 for a single test pattern 200 includes ten-thousand (10, 000) captures (i.e., Number of Captures*Number of STB's=1000*10=10,000).

FIG. 8 illustrates a process 1000 that includes the video capture of an image for each STB 6 and the resultant addition of the captured image, e.g. capture frame 310, to test database 12. Process 1000 begins in step 1001 in which test pattern 200 is selected by test cell controller 8. Generally, test cell controller is programmed to select a predetermined set of test patterns 200, selected to test outputs 62-67 of STBs 6.

Next, in step 1002, STB 6 is selected for capture by test cell controller 8. The STB 6 selected in this step should be a "known good" STB 6, i.e., an STB 6 known to produce an image that is likely to be acceptable. Alternatively, if it is not possible or practical to locate STBs 6 that will produce an image likely to be acceptable, use of a large enough number of STBs 6, e.g., about ten (10) in one embodiment, will generally suffice to produce a useful reference image. A test pattern 200 is applied to STB 6 via video network 3 and accordingly STB 6 provides outputs 62-67. Control then proceeds to step 1003.

In step 1003, interface 9 captures signals from composite output 62 of STB 6, which signals are temporarily stored in a memory associated with interface 9 and/or test cell controller 8. Control then proceeds to step 1004.

In step 1004, interface 9 captures signals the S-Video outputs 63, 64 of STB 6, which signals are temporarily stored in a memory associated with interface 9 and/or test cell controller 8. Because S-Video outputs 63, 64 comprise two discrete outputs, interface 9 simultaneously captures the signals from S-Video outputs 63, 64 and combines them into capture frame 310, then stores capture frame 310. Control then proceeds to step 1006.

In step 1006, interface 9 captures RGB outputs 65, 66, 67 of STB 6, which signals are temporarily stored in a memory associated with interface 9 and/or test cell controller 8. Because RGB outputs 65, 66, 67 comprise three discrete signals, interface 9 simultaneously captures the signals and combines them into capture frame 310, then stores capture frame 310. Control then proceeds to step 1008.

In step 1008, test cell controller 8 stores each capture associated with test pattern 200 determined in step 1000 in reference file 290 as video capture frame 310 for future reference with respect to an analysis process, e.g., process 1100 described in detail below with respect to FIG. 9. Control then proceeds to step 1010.

In step 1010, test cell controller 8 determines if the number of captures is complete for this sequence of test pattern 200 and "known good" STBs 6. For example, where one thousand captures are desired for each "known good" STB 6 and for each test pattern 200, the process will loop until the number of desired captures are taken. Generally, test cell controller 8 introduces predetermined delays and pseudo-random delays before additional samples are taken (see steps 1003, 1004, and 1006). Such a delay strategy trends away from a fixed sample period in an effort to avoid statistical anomalies that may interfere with the accuracy of sampling. If all captures are taken, control proceeds to step 1012. If more captures are to be taken, control proceed to step 1003.

In step 1012, test cell controller 8 determines if the desired number of "known good" STBs 6 have been tested (e.g., ten). Where a predetermined number of "known good" STBs 6 are to be tested, the process will loop until the desired number of "known good" STBs 6 has been tested. If the desired number of "known good" STBs 6 has been tested, control proceeds to step 1014. If not, control proceeds to step 1002 where another "known good" STB 6 is selected.

In step 1014, test cell controller 8 determines if the desired number of test patterns 200 have been captured. Generally, a number of different test patterns 200, including, e.g., test pattern 200 shown in FIG. 5A, will be desired for analyzing STBs 6. If the desired number of test patterns 200 has been captured, the process ends. If not, control proceeds to step 1000, in which another test pattern 200 is selected.

When complete, process 1000 will have accumulated and stored in database 12 a predetermined number of video reference frames 300 for a predetermined number of "known good" STBs 6, and for each test pattern 200. Thus, database 12 now comprises raw data, e.g., video capture frames 310, utilized to construct reference files 290, including reference frame 300.

FIG. 9 illustrates a process 1100 where capture frames 310 (e.g., stored in step 1008 of process 1000) are analyzed and a reference file 290 is generated. Process 1100 begins with step 1102 in which a set of video capture frames 310 is selected from test database 12, the selected video capture frames 310 corresponding to a test pattern 200 being analyzed. Control then proceeds to step 1104.

In step 1104, video capture frame 310 is averaged in a pixel-by-pixel and RGB-component-by-RGB-component manner to obtain reference frame 300. That is, for each pixel, values for each of the RGB components of the pixel, ranging in value from zero to two-hundred-fifty-five, are averaged. In this way, reference frame 300 includes averages for each pixel and for each ROB color for video capture frames 310 taken from test pattern 200 that was selected in step 1102. Control next proceeds to step 1106.

In step 1106, data from video capture frame 310 is added to a normal distribution data set 320 in a pixel-by-pixel and RGB-component-by-RGB-component manner. That is, for each pixel, values for each of the RGB components of the pixel, ranging in value from zero to two-hundred-fifty-five, are added to normal distribution data set 320. Thus, normal distribution data set 320 includes information from each video capture frame 310 in order to determine the normal distribution of values for each RGB color and for each pixel. Based on the collection of multiple video capture frames 310, a color-based population density function is developed. Control then proceeds to step 1108.

In step 1108, test cell controller 8 determines if all video capture frames 310 have been analyzed and whether a normal distribution has been achieved. During analysis of video capture frames 310, the resultant population distribution is monitored for anomalies. Test controller 8 will monitor the construction of normal distribution data set 320 and compare it with a statistical model (e.g., a regular Gaussian distribution or an experimentally determined distribution). In this way, test controller 8 can determine if normal distribution data set 320 is converging or diverging from the model.

Generally, to determine if a normal distribution has been achieved, test cell controller 8 determines whether sixty-eight percent (68%) of all observed color values in normal distribution data set 320 for each pixel lies within a range of ±1 standard deviation from the mean, and a range of ±2 standard deviations includes ninety-five percent (95%) of the observed color values. If all capture frames 310 have been analyzed without generating a normal distribution, a notation is made in test database 12 with respect to the associated test pattern 200 that a normal distribution was not achieved. Additionally, if normal distribution data set 320 is diverging from the model distribution, a message can be presented to a user. Also, test cell controller 8 may call for additional accumulation of capture frames 310. If all video capture frames 310 have been analyzed, the number of captures is noted as sample size (N$_f$) and control proceeds to step 1110. If all video capture frames 310 have not been analyzed, control proceeds to step 1102 for further processing.

In step 1110, a standard deviation matrix 304 of reference frame 300 is calculated. The standard deviation for each of the colors of every pixel of reference frame 300 is calculated using each sample and the sample size (N$_f$). Those skilled in the art will recognize the standard deviation is calculated, in this case as a "sample standard deviation," as the square root of sum of the squares matrix 308 of the deviations of each item in a population from the mean of the population. For example, the standard deviation for a color of a pixel is $$\sigma = \sqrt{\frac{\Sigma(X - \mu)^2}{N_f - 1}},$$

where σ is the standard deviation, X is an individual color sample for a pixel, μ is the mean of the color for a pixel, and N is the sample size (N$_f$). Additionally, as is known to those in the art of statistical analysis, calculations for sum of samples matrix 306, sum of squares matrix 308, and sample size (N$_f$) are calculated. In this step, the standard deviation for each color of each pixel is calculated. Sum of samples matrix 306 may be used when performing calculations inline with sampling and is used in calculating mean values for reference frame 300. Additionally, sum of squares matrix 308 may be used when performing calculations inline with sampling and is used in calculating standard deviations. It is important to recognize that the values for reference frame 300, standard deviation matrix 304. sum of samples matrix 306, sum of squares matrix 308, are all done in a pixel-by-pixel manner as well as having separate values for each color (e.g., red, green, and blue). Control then proceeds to step 1112.

In step 1112, reference frame 300 is stored in test database 12 in reference file 290, and further stored in association with reference frame 300 in reference file 290 are average color values for each pixel, the standard deviation for each color value of the pixel, and the sample size (N$_f$). Additional information, such as sum of samples matrix 306 and sum of squares matrix 308, may be stored for future use in updating reference file 290 with additional reference frames 300. Control then proceeds to step 1114.

In step 1114, test cell controller 8 determined whether all test patterns 200 have been analyzed. If so, the process ends as all test patterns 200 have been analyzed. If not, control proceeds to step 1102 where another test pattern 200 is analyzed.

Figure 10:
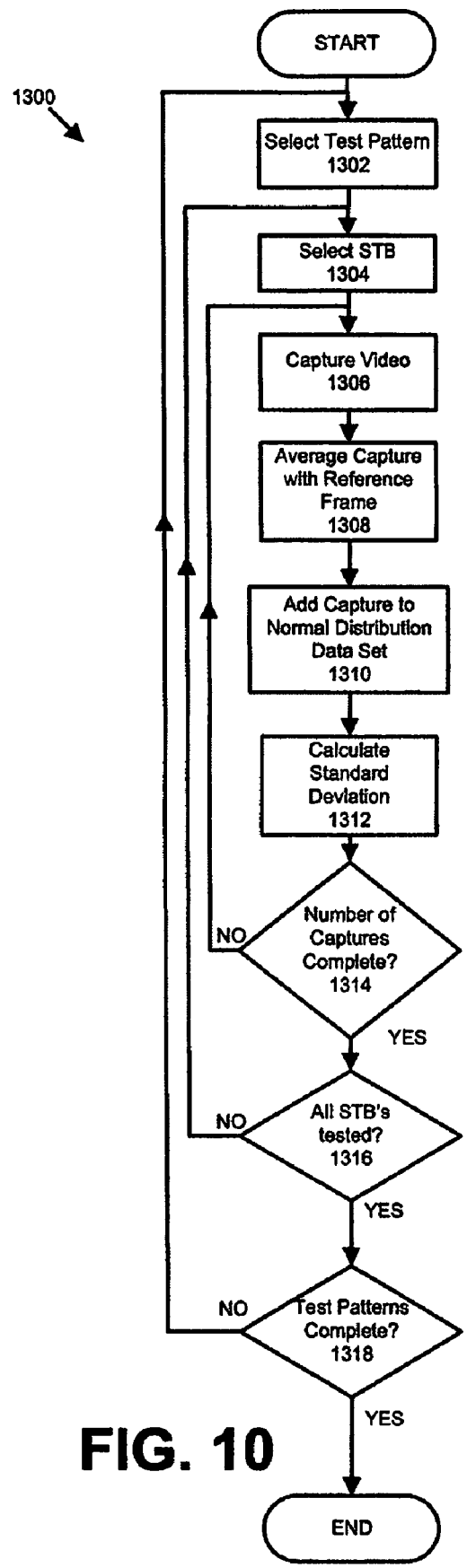
FIG. 10 illustrates a process that includes functions of video capture and analysis, in an alternative embodiment.

FIG. 10 illustrates a process 1300 where capture frames 310 are captured and analyzed and a reference file 290 is generated. Process 1300 begins in step 1302 in which test pattern 200 is selected by test cell controller 8. Control then proceeds to step 1304.

In step 1304, STB 6 is selected for capture by test cell controller 8. The STB 6 selected in this step should be a "known good" STB 6, i.e., an STB 6 known to produce an image that is likely to be acceptable. Alternatively, if it is not possible or practical to locate "known good" STBs 6, a significantly large number of STBs 6, e.g., about one hundred (100) in one embodiment, may be randomly selected from a population of operating STBs 6 and will generally suffice to produce a useful reference image. A test pattern 200 is applied to STB 6 via video network 3 and accordingly STB 6 provides outputs 62-67. Control then proceeds to step 1304.

In step 1306, interface 9 captures signals from outputs 62-67 of STB 6 and are temporarily stored in a memory associated with interface 9 and/or test cell controller 8. Control then proceeds to step 1308.

In step 1308, video capture frame 310 is averaged in a pixel-by-pixel and RGB-component-by-RGB-component manner to obtain reference frame 300. That is, for each pixel, values for each of the RGB components of the pixel, ranging in value from zero to two-hundred-fifty-five, are averaged. Control next proceeds to step 1310.

In step 1310, data from video capture frame 310 is added to a normal distribution data set 320 in a pixel-by-pixel and RGB-component-by-RGB-component manner. That is, for each pixel, values for each of the RGB components of the pixel, ranging in value from zero to two-hundred-fifty-five, are added to normal distribution data set 320. Thus, normal distribution data set 320 includes information from each video capture frame 310 in order to determine the normal distribution of values for each RGB color and for each pixel. Control then proceeds to step 1312.

In step 1312, standard deviation matrix 304 of reference frame 300 is calculated. The standard deviation for each of the colors of every pixel is calculated using each sample and the sample size (N$_f$). Those skilled in the art will recognize the standard deviation is calculated as the square root of sum of the squares matrix 308 of the deviations of each item in a population from the mean of the population (see step 1110 of FIG. 9 above). In this step, the standard deviation for each color of each pixel is calculated. Reference frame 300 is stored in test database 12 in reference file 290. Control then proceeds to step 1314.

In step 1314, test cell controller 8 determines if the number of captures is complete for this sequence of test pattern 200 and "known good" STBs 6. For example, where one thousand captures are desired for each "known good" STB 6 and for each test pattern 200, the process will loop until the number of desired captures are taken. Generally, test cell controller 8 introduces predetermined delays and pseudo-random delays before additional samples are taken (see step 1306). If all captures are taken, control proceeds to step 1316. If more captures are to be taken, control proceed to step 1306.

In step 1316, test cell controller 8 determines if the desired number of "known good" STBs 6 have been tested. If the desired number of "known good" STBs 6 have been tested, control proceeds to step 1318. If not, control proceeds to step 1304 where another "known good" STB 6 is selected.

In step 1318, test cell controller 8 determines if the desired number of test patterns 200 have been captured. If the desired number of test patterns 200 has been captured, the process ends. If not, control proceeds to step 1302, in which another test pattern 200 is selected.

Testing

Figure 11:
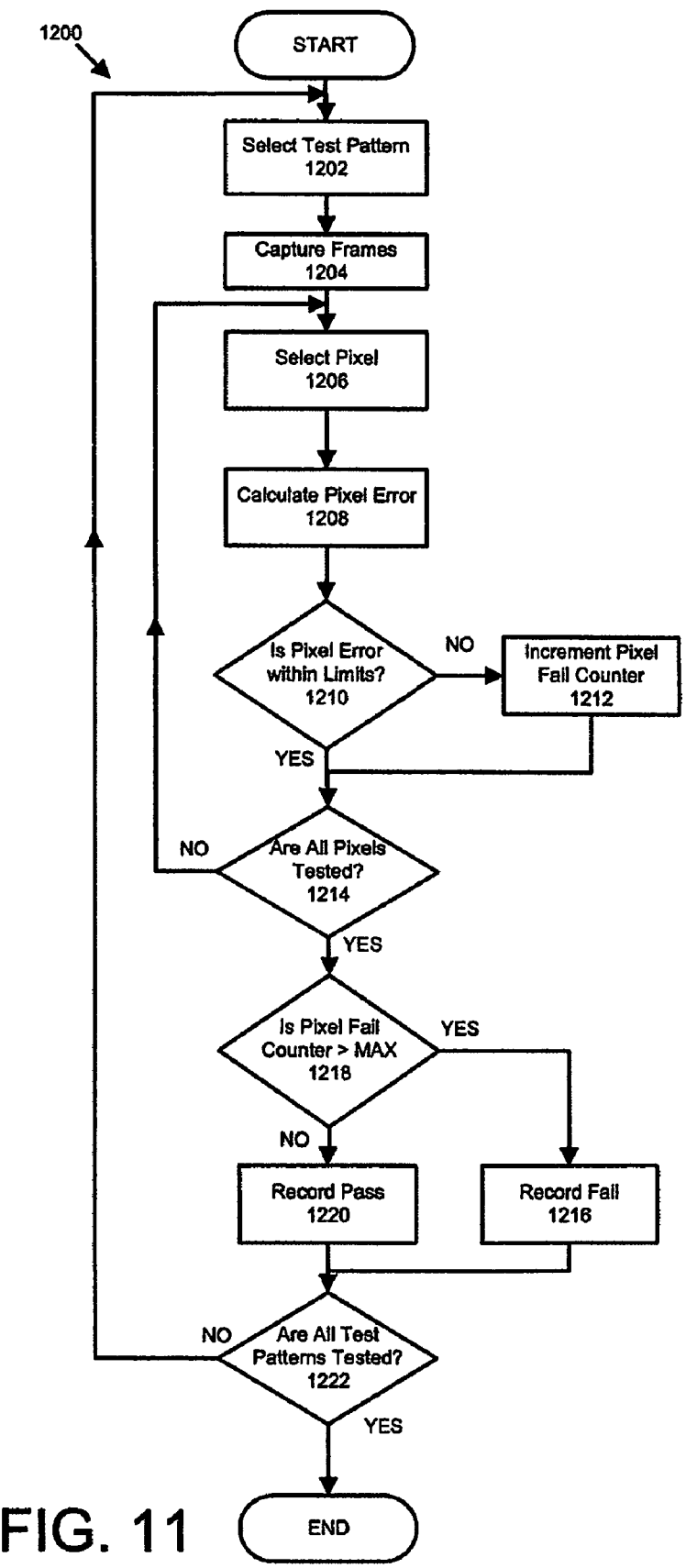
FIG. 11 illustrates a flow diagram of a STB test procedure for use with a set top box test system, according to an embodiment.

FIG. 11 illustrates a STB test procedure 1200 for testing outputs 62-67 of a test STB 6 against reference file 290 to determine whether test STB 6 is in compliance. The process beings at step 1202 where test cell controller 8 selects a test pattern 200 and a corresponding reference file 290 and causes test STB 6 to be supplied with a video signal. Control then proceeds to step 1204.

In step 1204, interface 9 captures at least one video frame. Preferably, about five (5) video frames are captured and averaged on a pixel-by-pixel and RGB-component-by-RGB-component basis. It is important to note that the averaging is not advantageous for a large number of large number video frames because a periodic anomaly will be hidden by the large sample size. On the other hand, averaging a small number of samples allows reduces the change that a spurious single-frame anomaly will trigger a false pixel failure (see step 1210 below). Thus, averaging a small number of samples avoids a false trigger due to a random event, but also allows detection of persistent problems. Control then proceeds to step 1206.

In step 1206, a pixel is selected for testing. Here, an individual pixel from the frame under test is selected and may represent, for example, a pixel within red test region 242 (illustrated in FIG. 5B). Control then proceeds to step 1208.

In step 1208, a pixel error is calculated as the difference in color values for the pixel chosen in step 1206. That is to say, for the selected pixel, the pixel error is the color value difference for an individual pixel between the frame under test and reference frame 300 in reference file 290. Hence, the pixel error is generally a relation between the captured color value of a pixel selected in step 1206 (of the captured video frame) and the corresponding pixel of the reference frame 300. Typically, the pixel error is calculated for each color of red, blue, and green. For example, where the pixel value of the frame under test is one-hundred (100) and the pixel value of reference frame 300 is one-hundred-two (102), the pixel error is two (2). In another example, where the RGB triplet for the frame under test is (100, 200, 50) and the RGB triplet for reference frame 300 is (120, 100, 200), then the pixel error is (20, -100, 150). Control then proceeds to step 1210.

In step 1210, test cell controller 8 determines whether the pixel error is within acceptable limits or is greater than a threshold. The determination of an acceptable limit based on the threshold is determined by comparing the pixel error with a predetermined number of standard deviations from standard deviation matrix 304 of reference file 290. In an exemplary embodiment, the threshold for the acceptable limit of pixel error is determined to be three (3) standard deviations from the mean. This provides that approximately ninety-nine percent (99%) of all pixels captured should pass the threshold. For example, where the pixel error is calculated to be six (6) and the standard deviation is two (2), the captured pixel is within acceptable limits and the pixel passes. However, where the pixel error is seven (7) and the standard deviation is two (2), then the pixel value lies outside the threshold of three (3) standard deviations and the pixel fails. Each pixel is tested against an individualized threshold for each color and a determination is made as to the pixel's pass/fail status. That is to say, the thresholds may be set for any triplet combination such as (R,G,B), (R,B), (R not G) etc., where each color component is allowed a threshold. For example, green is allowed one $\sigma$ (1 $\sigma$), where blue is allowed two $\sigma$ (2 $\sigma$). Further, red may be tested against a threshold while green is not tested at all. Further, each color component for each pixel is tested. If any of the color components for the pixel fails the threshold test, the entire pixel is deemed to have failed. If the pixel fails, control proceeds to step 1212. If the pixel passes, control proceeds to step 1214.

In step 1212, a pixel fail counter is incremented to indicate that the tested pixel has failed. Control then proceeds to step 1214.

In step 1214, test cell controller 8 checks whether all pixels have been tested. If all pixels have been tested, control proceeds to step 1218. If not, control proceeds to step 1206 where another pixel is selected for testing.

In step 1216, test cell controller 8 records that capture frame 310 has failed in reference to test pattern 200. Control then proceeds to step 1222.

In step 1218, test cell controller 8 determines whether or not an excessive number of pixels have failed testing by comparing against a maximum pixel fail value. In an exemplary embodiment, ten (10) percent of pixels are allowed to fail before a determination is made that the test frame has failed. However, depending upon the test conditions, test pattern 200, and the desired throughput of test system 1, maximum pixel fail value may be set to a higher or lower number. If maximum pixel fail value has been exceeded, control proceeds to step 1216. If maximum pixel fail value has not been exceeded, control proceeds to step 1220.

In step 1220, test cell controller 8 records that test pattern 200 has passed testing. Control then proceeds to step 1222.

In step 1222, test cell controller 8 checks whether all test patterns 200 have been tested. If all test patterns 200 are tested, the process ends. If not, control proceeds to step 1202 where another test pattern 200 is selected.

CONCLUSION

STB 6 test procedure 1200 tests each test pattern 200, for each STB 6 output 62-67, and for each color of each pixel under test. In this way, outputs 62-67 of STB 6 are checked for video quality by comparing them with reference frame 300. Additionally, the tolerances and thresholds for pixel error may be adjusted independently for each pixel, for each color, and for each capture frame 310 from STB outputs 62-7. Such flexibility allows for increased or decreased testing quality thresholds across the entire testing process.

Throughput, generally, of the test system 1 is further tunable by adjusting the threshold value of the standard deviation comparing the test frame with reference frame 300. In this way, if a higher "pass rate" is desired, the threshold may be increased to accordingly "pass" more STBs 6. Each of the thresholds can be determined based on expected throughput (output) of a test center. If during operation it is determined that the number of false rejections are too high, the threshold criteria can be revised and tuned in order to meet rejection or acceptance criteria of the test facility.

In an exemplary embodiment, the threshold for the "pass rate" is three standard deviations (3$\sigma$). However, if too many STBs 6 are failing the test sequence, the threshold may be changed to, for example, four standard deviations (4$\sigma$) so that more STB's will pass the test. On the other hand, where too many STB's are falsely accepted (i.e., allowed to pass while actually being defective), the threshold may be reduced from three standard deviations (3$\sigma$) to, for example, two-point-seven standard deviations (2.7$\sigma$) to reduce the passing rate. In this way, the thresholds may be adjusted for each parameter such that the desired pass rate or failure rate is achieved.

Further, as each frame under test is captured, reference frame 300 may be updated to include the new statistical data from the STB 6 under test. In this way, the population that comprises the reference file is dramatically increased, and thus, a better population density is found. Additionally, it is to be understood from the detailed description that the teachings herein may be applied not only to STBs 6, but also to other video and multimedia devices that provide video outputs, such as Video Cassette Recorders (VCR's), Digital Video Disk (DVD) players, and/or, disk-based Digital Video Recorders (DVR's).

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    capturing a frame from a first video device, said frame representing a test pattern;
    determining at least one captured color for at least one pixel of said captured frame;
    providing a reference pixel including at least one reference color, said reference pixel determined by statistical analysis of said first signals from a population of second video devices that have received said test pattern;
    determining a relation between said captured color value and said reference color;
    comparing said relation with a threshold value; and
    storing said relation.

2. The method of claim 1, further comprising adjusting said threshold value using a standard deviation of a distribution from said population of second video devices.

3. The method of claim 1, further comprising receiving a plurality of second signals from the first video device; wherein said frame is captured from the second signals.

4. The method of claim 3, wherein said plurality of second signals comprises at least one of a composite signal, a separated video (S-Video) signal, and a red-green-blue component signal.

5. The method of claim 3, wherein said plurality of second signals comprises at least two of a composite signal, a separated video (S-Video) signal, and a red-green-blue component signal.

6. The method of claim 3, wherein said plurality of second signals comprises at least two categories of video signals presenting the same image.

7. The method of claim 1, wherein said one reference color includes a primary color.

8. The method of claim 1, wherein said statistical analysis comprises generating a Gaussian curve and calculating a standard deviation based on the first signals.

9. A method, comprising:
    generating a pixilated reference frame based on samples from a population of video devices, said pixilated reference frame based on an averaged video image and at least one standard deviation from a color-based population density function for each pixel;
    obtaining a capture frame from each of said plurality of video devices;
    comparing at least one pixel of said capture frame to said pixilated reference frame to produce a pixel error; and
    determining if said pixel error is greater than a threshold.

10. The method of claim 9, wherein said pixel error is based on a comparison of a color component of said at least one pixel and said pixilated reference frame.

11. The method of claim 9, further comprising defining a pixel capture region of said capture frame, wherein said at least one pixel is chosen from said pixel capture region.

12. The method of claim 9, further comprising:
    adjusting said threshold such that a predetermined percentage of said video devices tested includes a pixel error less than said threshold.

13. The method of claim 9, wherein said capturing at least one pixel of said capture frame updates said reference frame.

14. The method of claim 9, wherein receiving a capture frame from each of said video devices includes sampling at least two categories of video signals presenting substantially the same image.

15. The method of claim 9, wherein receiving a capture frame from each of said video devices includes sampling at least two of a composite signal, S-Video signals, and red-green-blue component signal.

16. The method of claim 9, wherein said averaged video image comprises at least one average pixel value for a plurality of video frames, and said at least one color-based population density function for each pixel comprises a Gaussian distribution.

17. A system, comprising:
    a database including a reference file having at least a pixilated reference frame that is based on samples from a population of video devices, said pixilated reference frame based on an averaged video image and at least one standard deviation from a color-based population density function for each pixel;
    an interface that selectively obtains a capture frame;
    a computing device that includes the interface and that is in selective communication with the database; said computing device configured at least to compare at least one pixel of said capture frame to said pixilated reference frame to produce a pixel error; and to determine if said pixel error is greater than a threshold.

18. The system of claim 17, said computing device further configured to determine said pixel error based on a comparison of a color component of said at least one pixel and said pixilated reference frame.

19. The system of claim 17, said computing device further configured to define a pixel capture region of said capture frame, wherein said at least one pixel is chosen from said pixel capture region.

20. The system of claim 17, said computing device further configured to adjust said threshold such that a predetermined percentage of said video devices tested includes a pixel error less than said threshold.

21. The system of claim 17, said computing device further configured to update said reference frame using at least one pixel of said capture frame.

22. The system of claim 17, said computing device further configured to receive a capture frame from each of said video devices by sampling at least two types of video outputs presenting substantially the same image.

23. The system of claim 17, said computing device further configured to obtain a capture frame from each of said video devices including sampling at least two of a composite output, S-Video outputs, and component outputs.

24. The system of claim 17, wherein said averaged video image comprises at least one average pixel value for a plurality of video frames, and said at least one color-based population density function for each pixel comprises a Gaussian distribution.

* * * * *